(12) United States Patent
Goulart et al.

(10) Patent No.: US 9,928,541 B2
(45) Date of Patent: Mar. 27, 2018

(54) CONSUMER GUIDANCE WHILE SHOPPING FOR PRODUCTS

(71) Applicant: Wal-Mart Stores, Inc., Bentonville, AR (US)

(72) Inventors: Valerie Goulart, Seattle, WA (US); Stefan Li, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 815 days.

(21) Appl. No.: 13/931,704

(22) Filed: Jun. 28, 2013

(65) Prior Publication Data
US 2015/0006320 A1 Jan. 1, 2015

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0625* (2013.01)

(58) Field of Classification Search
CPC ...................................... G06Q 30/0601–30/08
USPC ................................................. 705/26.1–27.2
See application file for complete search history.

(56) References Cited

U.S. PATENT DOCUMENTS

| | | | |
|---|---|---|---|
| 6,587,835 B1 | 7/2003 | Treyz | |
| 6,785,671 B1 | 8/2004 | Bailey | |
| 6,954,735 B1 | 10/2005 | Djupsjobacka | |
| 7,580,699 B1 | 8/2009 | Shaw | |
| 7,620,651 B2 | 11/2009 | Chea | |
| 7,819,315 B1 | 10/2010 | Pienkos | |
| 8,671,106 B1 * | 3/2014 | Lee | G06F 17/3087 707/767 |
| 2005/0256782 A1 | 11/2005 | Sands | |
| 2008/0048830 A1 * | 2/2008 | Glynn | G06Q 10/06 340/5.91 |
| 2008/0231432 A1 * | 9/2008 | Stawar | B62B 3/1408 340/425.5 |
| 2009/0276300 A1 * | 11/2009 | Shaw | G06Q 20/102 705/14.1 |
| 2010/0063854 A1 | 3/2010 | Purvis | |

(Continued)

OTHER PUBLICATIONS

Aisle411 Rolls Out Version 2.0, Oct. 13, 2011, Close-Up Media, Inc. (Year: 2011).*

*Primary Examiner* — Brandy A Zukanovich
*Assistant Examiner* — Brittney N Miller
(74) *Attorney, Agent, or Firm* — Bryan Cave LLP

(57) ABSTRACT

A computer-implemented method is disclosed herein. The method includes the step of receiving, with a processing device of a guidance server, a series of guidance request signals from an electronic computing device operated by a consumer shopping in a retail store. Each guidance request signal contains an alphanumeric character. The method also includes the step of determining, with the processing device, at least one location within the retail store in response to the alphanumeric characters contained in any already-received guidance request signals after each of the series of guidance request signals is received. The method also includes the step of transmitting, with the processing device, a series of guidance response signals to the electronic computing device in response to the determination of the at least one location. Each of the series of guidance response signal contains data indicative of the determined location within the retail store.

20 Claims, 6 Drawing Sheets

(56) References Cited

U.S. PATENT DOCUMENTS

2010/0169336 A1\* 7/2010 Eckhoff-Hornback ... G06Q 10/087 707/758
2014/0280039 A1\* 9/2014 Bach .................. G01C 21/3611 707/722

\* cited by examiner

CONSUMER GUIDANCE WHILE SHOPPING FOR PRODUCTS

BACKGROUND INFORMATION

Field of the Disclosure

The present invention relates generally to assisting a consumer in locating products available for purchase. In particular, a consumer can be provided with the locations of products within a physical retail store as well as the availability of products offered for sale through a corresponding online store as the consumer types the name of the product on a mobile, electronic computing device.

Background

Some retail stores extend across tens of thousands of square feet and offer thousands of products for sale. Many consumers visit such retail stores when shopping for a diverse set of products such as groceries, office supplies, and household wares. Typically, these stores can have dozens of aisles and numerous departments. Accordingly, traversing these aisles looking for specific products may be a challenging experience. Locating the general vicinity of the product is a first part of the process. Once the consumer arrives at the aisle or department of the product of interest, the particular product must be identified from among all of the products displayed within the aisle. Many products are sold in small packages and are therefore difficult to see easily. Further, the packaging of most products is designed to draw attention, so the consumer's vision can be inundated with numerous products attracting focus. Additionally, some products may be offered only through an online retail store that complements physical retail stores. It may not be self-evident to the consumer that a product offered for sale online would not also be offered at a corresponding physical retail store. A consumer may become frustrated by this chain of events and might pursue purchasing the product at another retail store.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
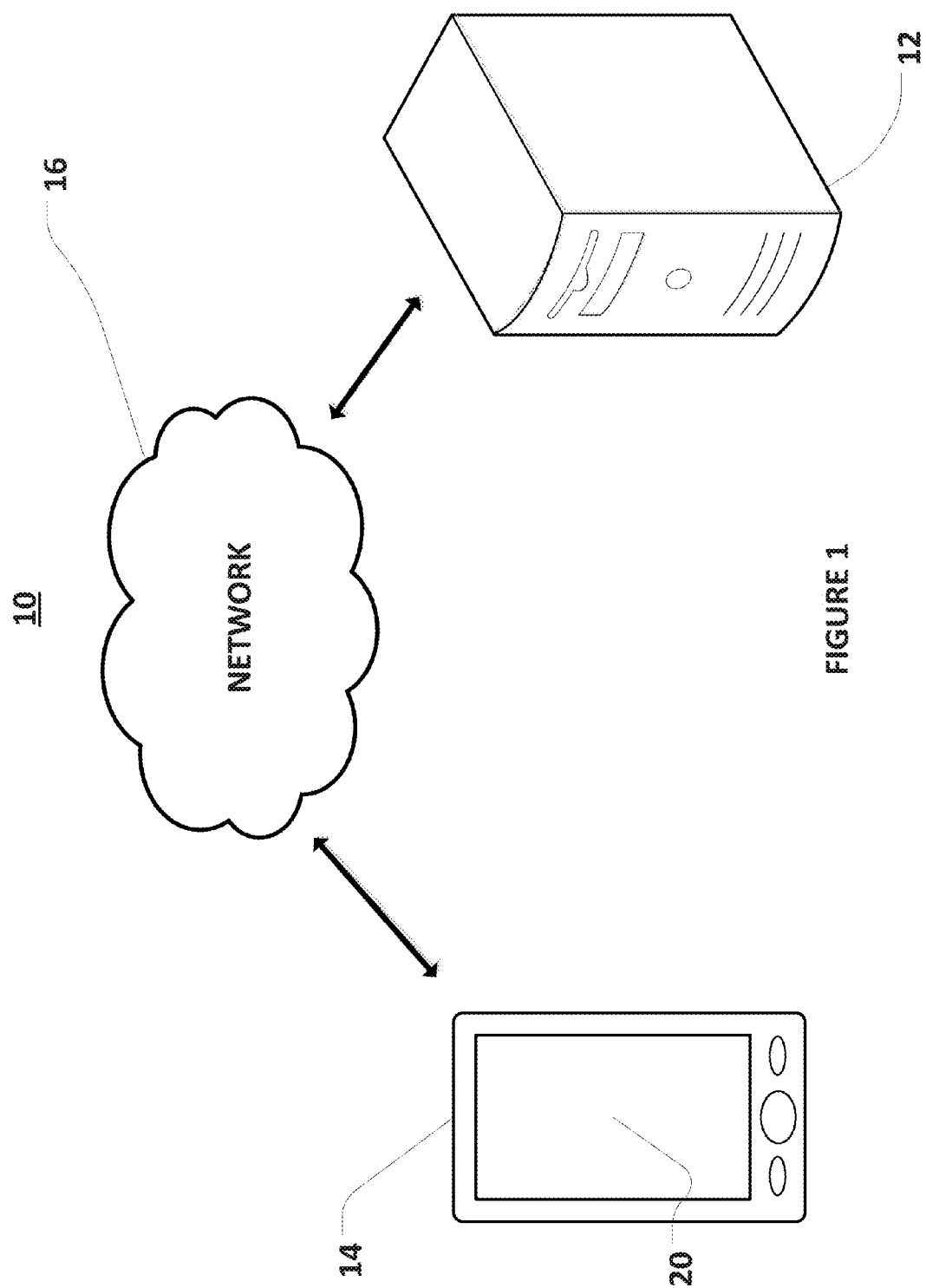
FIG. 1 is an example schematic illustrating a system according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist consumers that are shopping in a retail store. An embodiment of the present disclosure can assist a consumer by providing the locations of products of interest within the retail store. An embodiment of the present disclosure can also assist the consumer by providing the availability of products of interest within the physical retail store or through an online retail store that is complementary to the physical retail store. An embodiment of the present disclosure can help reduce the time and stress that can arise while shopping and thus make a shopping trip a more enjoyable and satisfying experience.

A guidance system according to some embodiments of the present disclosure can be operable to receive a series of guidance request signals from an electronic computing device operated by a consumer shopping in a retail store. A guidance request signal can contain data indicative of a consumer's desire for the location and availability of a particular product. The consumer may desire to purchase a particular product. Each guidance request signal can contain an alphanumeric character. The consumer can be entering text with the electronic computing device. Each letter of text can be communicated to a guidance server of the guidance system. An electronic computing device operated by the consumer can be a smart-phone, a tablet, an e-reader, or any other electronic computing device operable to receive and transmit data, such as video data, audio data, textual data, and other forms of data. The consumer can transmit the series of guidance request signals by typing a series of letters to spell a word, the typing executed with the electronic computing device.

A guidance system according to some embodiments of the present disclosure can be operable to determine at least one location within the retail store in response to the alphanumeric characters contained in any already-received guidance request signals after each of the series of guidance request signals is received. For example, in response to receipt of a fourth guidance request signal, the system can analyze the first four alphanumeric characters received from the consumer and determine what product the consumer may be attempting to locate. When each guidance request signal is received, a system according to an embodiment of the present disclosure can re-determine what product the consumer may be attempting to locate. As more guidance request signals are received, the likelihood that the correct product will be determined increases. Initially, when relatively few guidance request signals have been received, a system according to an embodiment of the present disclosure can present a relatively greater number of alternative products to the consumer. But as more guidance request signals are received, fewer products will match the string of alphanumeric characters transmitted by the consumer and therefore fewer products will be proposed to the consumer. In some embodiments of the disclosure, the electronic computing device can be running an app that allows the consumer to submit guidance request signals.

A guidance system according to some embodiments of the present disclosure can be operable to transmit a series of guidance response signals to the electronic computing device. Each guidance response signal can be transmitted in response to the receipt of one of the series of guidance request signals. Each of the series of guidance response signal contains data indicative of one or more locations within a physical retail store and/or one or more product availabilities through an online retail store. It is noted that generally "location" refers to a physical position of a product within a physical retail store. The guidance response signal can help guide the consumer to a location and thus to a product. The guidance response signal can include video data, textual data, or both in some embodiments of the present disclosure.

Each of the series of guidance response signals can be transmitted after a determination has been made regarding what product or products the consumer is attempting to locate. Each time the consumer selects another alphanumeric character and transmits that alphanumeric character, a system according to an embodiment of the present disclosure can first determine one or more possible products that the consumer is attempting to locate based on all of the alphanumeric characters that have been received, including the alphanumeric character currently received and all alphanumeric characters previously received. The system can then transmit the locations and availability of each of these products. This process can be repeated every time the consumer transmits another alphanumeric character.

Embodiments of the present disclosure provide numerous benefits to consumers. For example, a consumer is not required to needlessly search through the retail store for products or for an employee to obtain directions. Assistance can be provided at the location of the consumer within the retail store and the consumer can travel directly to the product of interest. Further, the consumer is not at risk of wasting effort, such as when an employee of the retail store, when found, does not possess the knowledge needed to assist the consumer. The locations of products in a physical retail store and the availability of products in an online store can be dynamically updated on a mobile electronic computing device as the consumer spells the name/identity of the product of interest. Embodiments of the present disclosure can thus allow a consumer to obtain prompt assistance.

FIG. 1 is a schematic illustrating a guidance system 10 according to some embodiments of the present disclosure. The guidance system 10 can execute a computer-implemented method that includes the step of receiving, with a guidance server 12, a series of guidance request signals from an electronic computing device 14 operated by a consumer shopping in a retail store. Embodiments of the present disclosure can be practiced wherein the guidance server 12 can receive guidance request signals from a plurality of different consumers, shopping in a plurality of different retail stores that are geographically spaced from one another. Embodiments of the present disclosure can also be practiced wherein the guidance server 12 can receive guidance request signals from a plurality of different consumers, some shopping at physical retail stores and others shopping through an online retail store. The physical retail stores and the online store can complement one or another, or correspond to one another, in that the physical retail stores and the online store can be operated by the same entity or offer similar products.

The guidance request signals transmitted by the electronic computing device 14 and received by the guidance server 12, and vice-versa, can be communicated over a network 16. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The electronic computing device 14 can include a display 20. The electronic computing device 14 can also include internal components (and therefore not visible in FIG. 1), such a position sensor. The display 20 can be configured to display video content to the consumer. The display 20 can be configured to display text, graphics, images, illustrations and any other video data to the consumer. The position sensor can be configured to generate a position signal indicative of the position of the electronic computing device 14 (and thus the consumer as well) within a physical retail store. The position sensor can be configured to detect an absolute or relative position of the consumer possessing the electronic computing device 14. The position signal containing position data can be transmitted to the guidance server 12 over the network 16.

Identifying the position of the consumer can be accomplished by radio, ultrasound or ultrasonic, infrared, or any combination thereof. The position sensor can be a component of a real-time locating system (RTLS), which is used to identify the location of objects and people in real time within a building such as a retail store. The position sensor can include a tag that communicates with fixed reference points in the retail store. The fixed reference points can receive wireless signals from the position sensor. The position signal can be processed to assist in determining one or more products that are proximate to the consumer. The guidance server 12 can receive position data and identify the position of the consumer in some embodiments of the present disclosure.

Each of the guidance request signals transmitted to the guidance server 12 can contain an alphanumeric character. In response to each guidance request signal, the guidance server 12 can determine what product the consumer may be attempting to locate. The guidance server 12 can access a retail store database that stores the identities of the products offered for sale at physical retail stores and available through an online store. Based on the accumulated alphanumeric characters received from the consumer, the guidance server 12 can retrieve identities of products from the retail store database that contain the accumulated alphanumeric characters in the order that the alphanumeric characters were received. In some embodiments, the guidance server 12 can delay determining one or more products until some predetermined number of alphanumeric characters have been accumulated, such as three.

In some embodiments of the present disclosure, the guidance request signal can be generated by an app running on the consumer's electronic computing device 14. An app can be software used on a smart phone or another mobile device. An app can also be software that is accessed and used while online, with a browser, instead of software residing on the electronic computing device. An app can be a software program or a set of programs created to significantly improve existing functions of a device or to provide a device with new function. The guidance server 12 can transmit the app to the electronic computing device 14 in some embodiments of the present disclosure. The use of an app by the consumer can simplify the processing of the guidance request signals for the guidance server 12.

The guidance server 12 can transmit a series of guidance response signals to the electronic computing device 14 in response to the series of guidance request signals. The receipt of each guidance request signal by the guidance server 12 can result in the transmission of a guidance response signal. In some embodiments, the guidance server 12 can delay transmitting guidance response signals until some predetermined number of guidance request signals have been received, such as three or more. The guidance response signal can contain data that can be displayed on the display 20 of the electronic computing device 14 and can guide the consumer to the desired product, such as to the location of the product in a physical retail store or to the availability of the product through an online retail store.

Each guidance response signal can include video data such as a map that can be displayed on the display 20. The guidance response signal can include textual data such as a name/identity of one or more products. In some embodiments of the present disclosure, a guidance response signal can include data sufficient for the electronic computing device 14 to display a map on the display 20. Further, the guidance response signal can include data sufficient for the electronic computing device 14 to display one or more beacon indicia on the map. A beacon indicia can take the form of a flag, or a pin, or some other shape and can overlay the details of the map. A beacon indicia can be displayed at a position on the map corresponding to the location of a product within the retail store. For example, if the guidance server 12 determines that the consumer may be attempting to locate a television, a guidance response signal can include data sufficient for the electronic computing device 14 to display a map on the display 20 as well as a beacon indicia positioned on the map where televisions are located in the physical retail store. Beacon indicia can be differently colored if the product is out-of-stock or available online only.

The guidance response signal can also include data sufficient for the electronic computing device 14 to display text. Text can be displayed proximate to each beacon indicia. The text can be the identity of the product located in the physical retail store at the position of the beacon indicia.

Embodiments of the present disclosure can allow a consumer to enter text with an electronic computing device such as a mobile device and, as the consumer types in a search term, a store map can dynamically update to show the locations of matched products. Embodiments can also be helpful to consumers when searching for online-only products as well. Products that are available online can be shown in conjunction with a map showing products that are available in the consumer's local, physical retail store.

Figure 2:
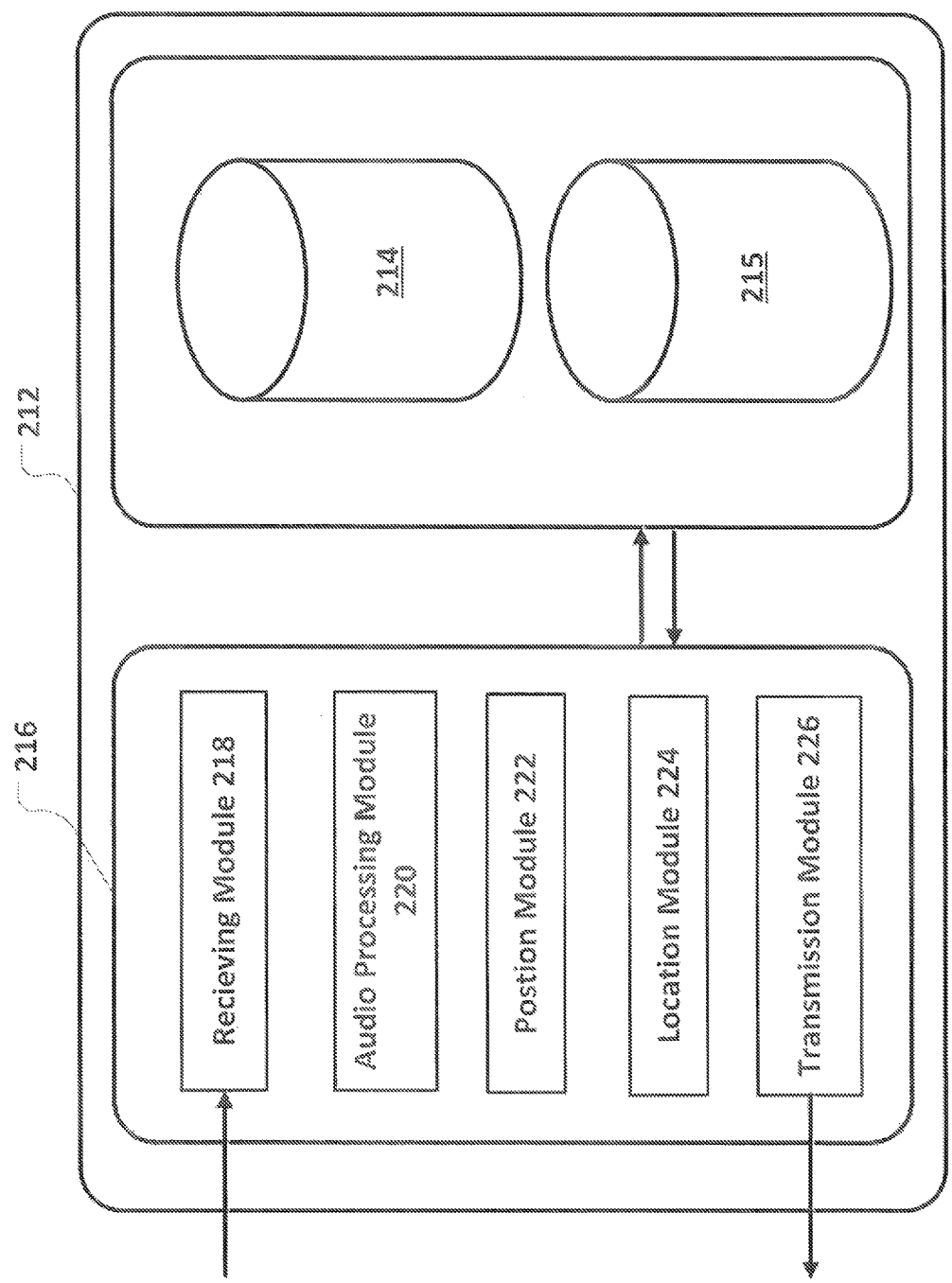
FIG. 2 is an example block diagram illustration of a guidance server that can be applied in some embodiments of the present disclosure.

FIG. 2 is a block diagram illustrating a guidance server 212 according to some embodiments of the present disclosure. In the illustrated embodiment, the guidance server 212 can include a retail store database 214 and a product database 215. The guidance server 212 can also include a processing device 216 configured to include a receiving module 218, an audio processing module 220, a position module 222, a location module 224, and a transmission module 226.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The retail store database 214 can include in memory the identities of a plurality of products. The plurality of products can be the products offered for sale in one or more retail stores associated with the guidance server 212. The retail stores can be physical retail stores or online retail stores. The retail store database 214 can also contain floor plans of the one or more physical retail stores, including the location of each of the plurality of products within each retail store and the availability or level of stock for each product. The data in the retail store database 214 can be organized based on one or more tables that may utilize one or more algorithms and/or indexes.

The product database 215 can include in memory the identities of a plurality of products. The plurality of products can be the products offered for sale in the retail stores associated with the guidance server 212. The product database 215 can also contain specifications and product details for the products. The product database 215 can also contain consumer reviews of at least some of the products. The data in the product database 215 can be organized based on one or more tables that may utilize one or more algorithms and/or indexes.

The processing device 218 can communicate with the retail store database 214 and the product database 215 and receive one or more signals from the electronic computing device 14. The processing device 218 can include computer readable memory storing computer readable instructions and one or more processors executing the computer readable instructions.

The receiving module 218 can be operable to receive signals over the network 16, assess the signals, and communicate the signals or the data contained in the signals to other components of the guidance server 212. The receiving module 218 can be configured to receive guidance request signals, position signals, and other signals from one or more consumers operating respective electronic computing devices 14.

The receiving module 218 can receive a guidance initialization signal containing audio data such as the voice of a consumer. In some embodiments of the present disclosure, a consumer can issue a voice command through the electronic computing device to begin the search for a product. A signal containing audio data can be directed to the audio processing module 220 for further processing. Speech by a consumer can be captured by a microphone associated with the electronic computing device 14 and can be transmitted to the guidance server 212 by the electronic computing device 14. The voice of the consumer can be continuously monitored through an app as the consumer shops in some embodiments of the present disclosure.

The audio processing module 220 can analyze the audio data contained in a consumer signal, such as verbal statements made by a consumer. The audio processing module 220 can implement known speech recognition techniques to identify speech in an audio signal. The consumer's speech can be encoded into a compact digital form that preserves its information. The encoding can occur at the electronic computing device 14 or at the guidance server 212. The audio processing module 220 can be loaded with a series of models honed to comprehend language. When encoded locally, the speech can be evaluated locally, on the electronic computing device 14. A recognizer installed on the electronic computing device 14 can communicate with the guidance server 212 to gauge whether the voice contains a command can be best handled locally or if the guidance server is better suited to execute the command. The audio processing module 220 can compare the consumer's speech against a statistical model to estimate, based on the sounds spoken and the order in which the sounds were spoken, what letters might be contained in the speech. At the same time, the local recognizer can compare the speech to an abridged version of that statistical model applied by the audio processing module 220. For both the guidance server 212 and the electronic computing device 14, the highest-probability estimates are accepted as the letters contained in the consumer's speech. Based on these estimations, the consumer's speech, now embodied as a series of vowels and consonants, is then run through a language model, which estimates the words of the speech. Given a sufficient level of confidence, the audio processing module 220 can then create a candidate list of interpretations for what the sequence of words in your speech might mean. If there is enough confidence in this result, the audio processing module 220 can determine the consumer's intent.

In a first example, a consumer can state "I would like help finding something" in an embodiment of the present disclosure. This statement can be contained in a guidance initialization signal received by the guidance server 212. The guidance initialization signal can be processed and the statement can be recognized by the audio processing module 220. In response, the audio processing module 220 can communicate the indication that guidance is requested to receiving module 218. Thus, the signal containing the consumer's voice expressing a request for assistance can define a guidance initialization signal. The receiving module 218 can recognize subsequent signals from the electronic computing device 14 as guidance request signals. The receiving module 218 can direct guidance request signals to the locating module 224 for further processing, as will be set forth in greater detail below.

The receiving module 218 can receive position signals from the position sensor of the electronic computing device 14. The position signal can be generated by the position sensor and contain data corresponding to a position of the electronic computing device 14 within a physical retail store. It is noted that the position could be determined in other ways in other embodiments of the present disclosure. The receiving module 218 can direct position signals to the position module 222. The position module 222 can receive the position signal and derive the position of the electronic computing device 14 in response to the content of the position signal. The position module 222 can communicate position data of the electronic computing device 14 to the location module 224.

The location module 224 can be configured to act on guidance request signals received from consumers. Each guidance request signal can contain an alphanumeric character. After receiving a guidance request signal from a consumer, the location module 224 can access the retail store database 214 and retrieve products having an identity containing the alphanumeric character contained in the guidance request signal. The guidance request signals can be accumulated in that the retail store database 215 can be searched based on a string of alphanumeric characters transmitted to the guidance server 212.

When a product identity containing the string of alphanumeric characters is identified, the location module 224 can retrieve a location of the product within the retail store and/or the availability of the product through the online store. This can be completed for all products having an identity containing the string of alphanumeric characters received from the electronic computing device 14. The location module 224 can then assemble all of the data to be transmitted as a guidance response signal. This data can include a visible map, visible indicia, text, and/or any other format of data that can help inform the consumer of the location and/or availability of the product. The location module 224 can then direct the transmission module 226 to transmit the guidance response signal to the electronic computing device 14.

In some embodiments of the present disclosure, the receiving module 218 can be configured to receive product interest signals from the electronic computing device 14. The electronic computing device 14 can receive guidance response signals and generate a map on the display 20, with beacon indicia showing the locations of products of possible interest. The consumer can select one of the beacon indicia. When this occurs, the electronic computing device 14 can transmit a product interest signal. The product interest signal can contain data indicative of the product that has been associated with the beacon indicia that was selected. The receiving module 218 can direct product interest signals to the location module 224. In response to receiving a product interest signal, the location module 224 can access the product database 215 and retrieve information associated with the product. The location module 224 can direct the transmission module 226 to transmit a product information signal to the electronic computing device 14 in response to the product interest signal. The product information signal can contain data associated with the product of interest to the consumer.

In some embodiments of the present disclosure, the location module 224 can propose one or more alphanumeric characters to the consumer in response to the alphanumeric characters contained in the already-received guidance request signals. For example, if the consumer transmits the alphanumeric characters "t," "e," and "l" to the guidance server 212, the location module 224 can recognize the likelihood that the next character will be "e" based on the identities of products in the retail store database 214. For example, upon searching the retail store database 214, the location module 224 can identify that a relatively high percentage of products containing alphanumeric characters "t," "e," and "l" also contain the alphanumeric characters "v," "i," "s," "o," and "n." Therefore, in some embodiments of the present disclosure, the location module 224 can direct the transmission module 226 to transmit a proposed character signal to the electronic computing device 14 containing the letters "v," "i," "s," "o," and "n" in response to receiving the alphanumeric characters "t," "e," and "l" from the electronic computing device 14. The proposed character signal can result in the electronic computing device 14 displaying the word "television" in the field of the display 20 in which the consumer enters text.

It is noted that the various processing functions set forth above can be executed differently than described above in order to enhance the efficiency of an embodiment of the present disclosure in a particular operating environment. The processor of the electronic computing device 14 can assume a greater role in processing some of the signals in some embodiments of the present disclosure. For example, in some embodiments, the processor of the electronic computing device 14 could process audio signals received through a microphone of the electronic computing device, such signals corresponding to audible commands from the consumer.

Figure 3A:
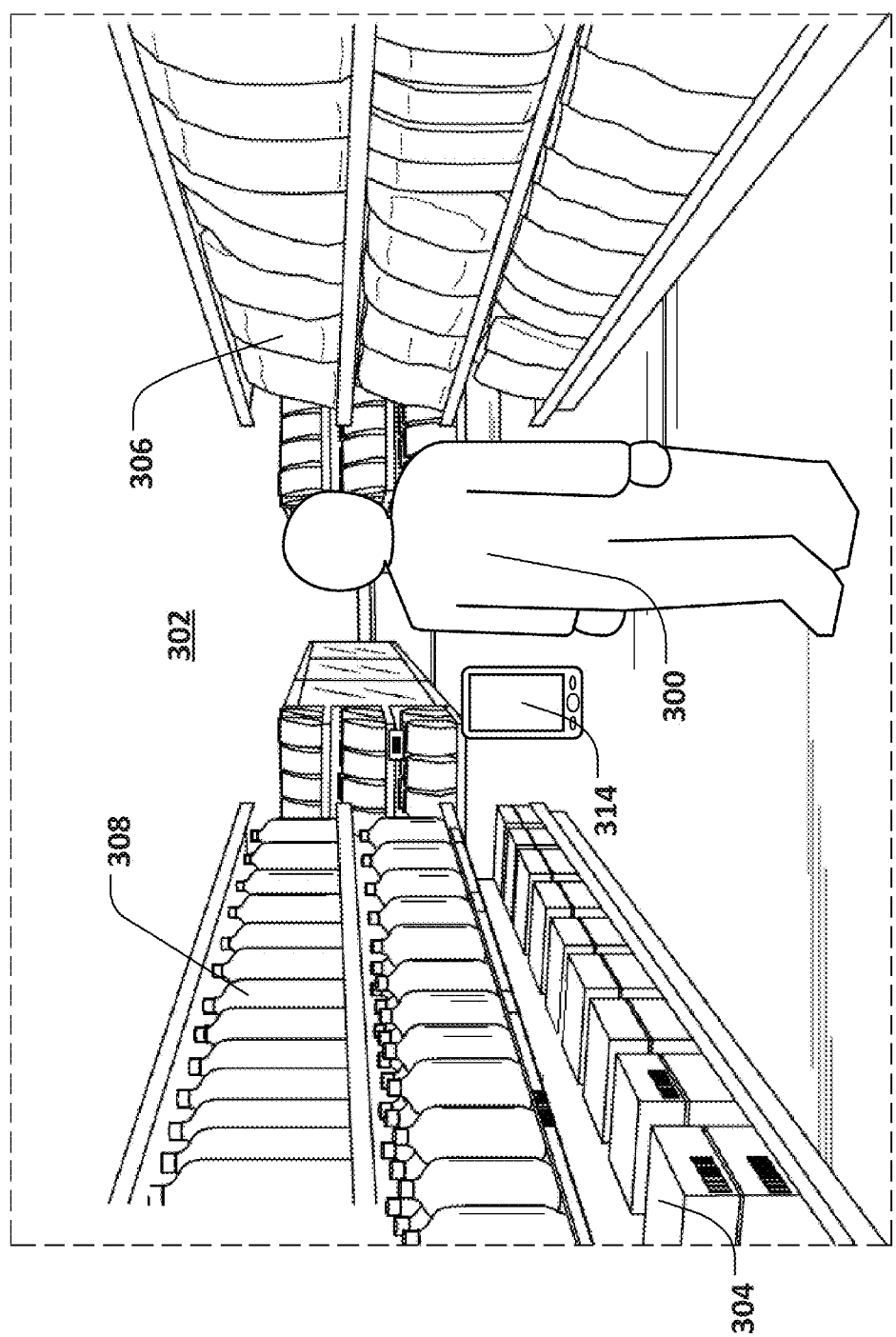
FIG. 3A is an exemplary view of a consumer shopping in some embodiments of the present disclosure.

FIG. 3A is a perspective view of a consumer 300 while shopping in some embodiments of the present disclosure. The consumer 300 can be within a retail store 302, amid shelving supporting various products 304, 306, 308 offered for sale in the retail store 302. The consumer can be operating an electronic computing device 314, such as a phone. In some embodiments of the present disclosure, the consumer can initiate guidance by stating "please help me find . . . " some product. The statement can be contained in an audio signal transmitted to the guidance server 212 by the electronic computing device 314. The guidance server 212 can detect the speech in the audio signal and recognize the signal as a guidance initialization signal. In some embodiments, the consumer 300 can transmit a guidance initialization signal through an app on the electronic computing device 314.

Figure 3B:
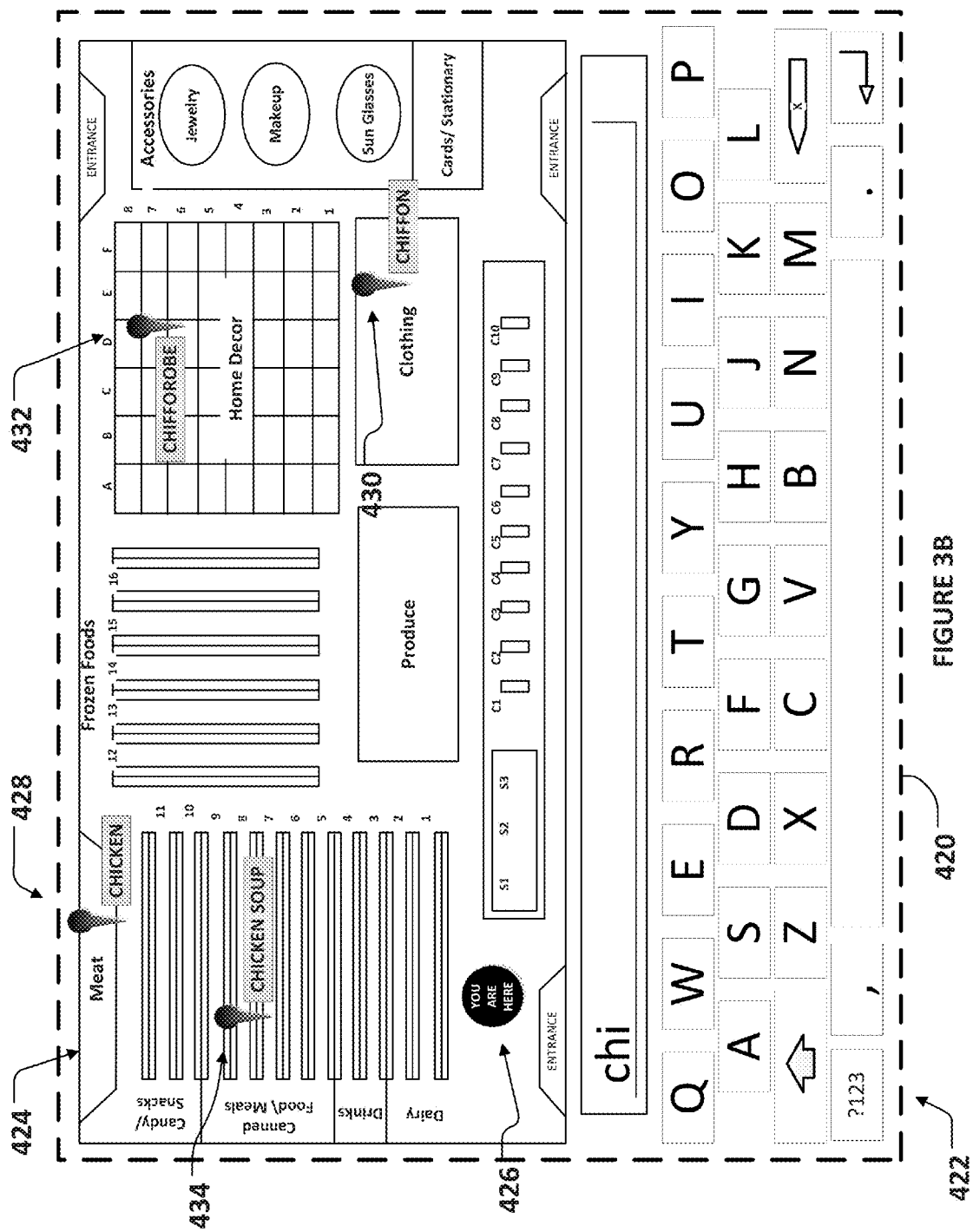
FIG. 3B is an exemplary screen shot from an electronic computing device operated by a consumer in some embodiments of the present disclosure.

FIG. 3B is a screen shot from a display 420 of an exemplary electronic computing device executing an app that can be applied in some embodiments of the present disclosure. The electronic computing device can present a keyboard 422 to the consumer for entering alphanumeric characters. The exemplary consumer has transmitted three guidance request signals, the letters "c," "h," and "i." In response to the last guidance request signal, which contained the alphanumeric character "i," the guidance server 212 transmitted a guidance response signal containing a map 424. The alphanumeric characters "c" and "h" were contained in the already-received guidance request signals. The map 424 has been made visible on the display 420 as the result of receipt of a guidance response signal from the guidance server 212. The data for generating the map 424 can be contained in the guidance response signal. The map 424 is a layout of the consumer's local physical retail location and has been annotated with words that indicate the different regions and departments of the physical retail store. For example, the retail store includes "frozen foods" region, a "candy/snacks" region, and a "produce" region. Aisles within some of the regions of the retail store are also annotated numerically. Visual indicia 426 can correspond to the position of the consumer. The position of the consumer can be contained in the guidance response signal. The location module 224 can receive data corresponding to the consumer's position from the position module 222 and include this data in the guidance response signal for display on the map 424.

A plurality of beacon indicia 428, 430, 432, and 434 over-lay the map 424. The data for generating the plurality of beacon indicia 428, 430, 432, and 434 can be contained in the guidance response signal. Each of the plurality of beacon indicia 428, 430, 432, and 434 is positioned on the map at a location within the physical retail store. The locations correspond to products with identities containing the alphanumeric characters transmitted to the guidance server 212. For example, the consumer has transmitted the letters "c," "h," and "i." The guidance server 212 has identified four products with identities (or names) containing the letters "c," "h," and "i." The names of the products can be displayed in text boxes positioned proximate to the respective beacon indicia 428, 430, 432, and 434.

The beacon indicia 428, 430, 432, and 434 can be colored differently with respect to one another. For example, a first color of a beacon indicia can correspond to a product that is in-stock at the physical retail store. A second color can correspond to a product that is out-of-stock, but otherwise offered for sale at the physical retail store. A third color can correspond to a product that is only available through an online retail store.

Figure 3C:
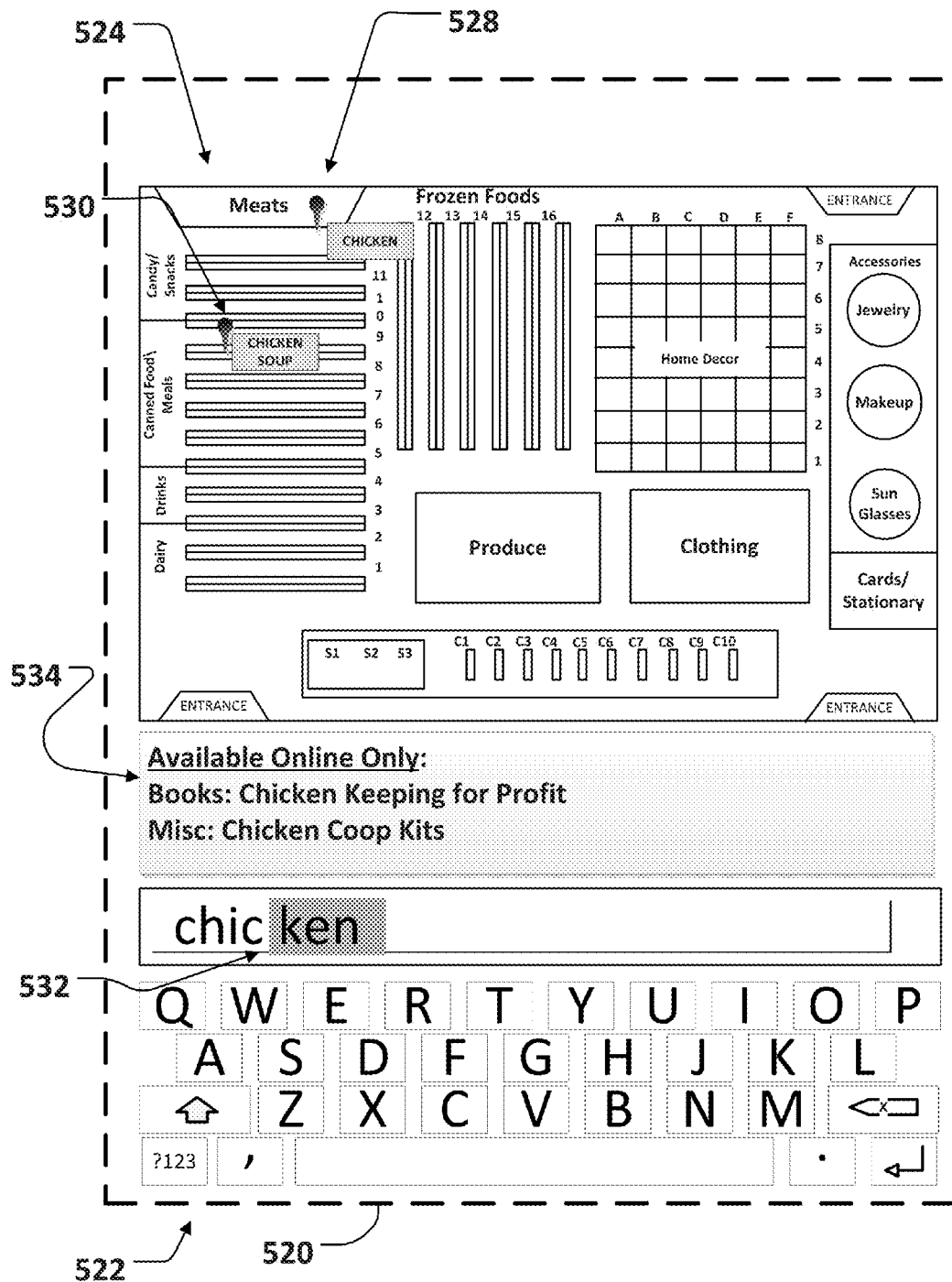
FIG. 3C is an exemplary screen shot from an electronic computing device operated by a consumer in some embodiments of the present disclosure.

FIG. 3C is a screen shot from a display 520 exemplary of an exemplary electronic computing device executing an app that can be applied in some embodiments of the present disclosure. The electronic computing device can present a keyboard 522 to the consumer for entering alphanumeric characters. The exemplary consumer has transmitted four guidance request signals, the letters "c," "h," "i," and "c." In response to the last guidance request signal, which contained the alphanumeric character "c," the guidance server 212 transmitted a guidance response signal containing a map 524. The alphanumeric characters "c," "h," and "i" were contained in the already-received guidance request signals. The map 524 has been made visible on the display 520 as the result of receipt of a guidance response signal from the guidance server 212. The data for generating the map 524 can be contained in the guidance response signal. The map 524 is a layout of the retail location and has been annotated with words that indicate the different regions and departments of the physical retail store. For example, the retail store includes "frozen foods" region, a "candy/snacks" region, and a "produce" region. Aisles within some of the regions of the retail store are also annotated numerically.

A plurality of beacon indicia 528 and 530 over-lay the map 524. The data for generating the plurality of beacon indicia 528 and 530 can be contained in the guidance response signal. Each of the plurality of beacon indicia 528 and 530 is positioned on the map at a location within the physical retail store. In response to receiving the letters "c," "h," "i," and "c," the guidance server 212 has proposed the additional characters "k," "e," and "n," as referenced at 532.

The guidance response signal can also contain data associated with products available at the online retail store that complements the physical retail store. The guidance response signal sent by the guidance server 212 contained information related to two products containing the alphanumeric characters received from the consumer "c," "h," "i," and "c," as well as the proposed letters "k," "e," and "n." The two online products are referenced at 534.

Figure 4:
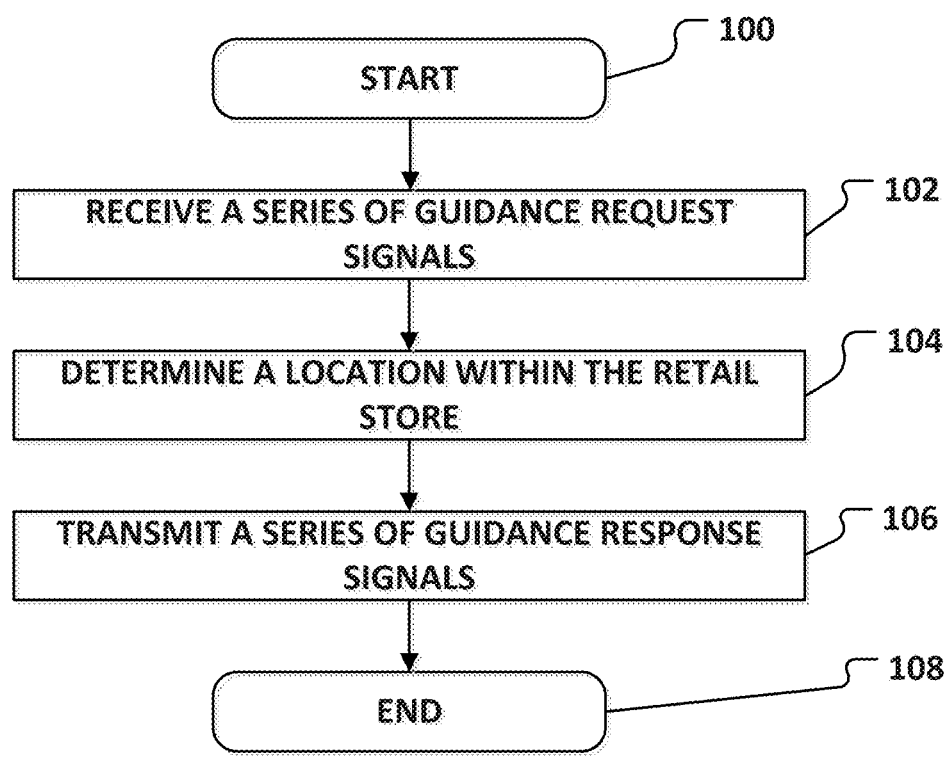
FIG. 4 is an example flow chart illustrating a method that can be carried out according to some embodiments of the present disclosure.

FIG. 4 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 4 is a flow chart illustrating a method that can be carried out in some embodiments of the present disclosure. The method can be executed by a guidance server. The guidance server can be located at the retail store or can be remote from the retail store. The method starts at step 100. At step 102, the guidance server can receive a series of guidance request signals from an electronic computing device operated by a consumer shopping in a retail store. Each guidance request signal contains an alphanumeric character. At step 104, the guidance server can determine at least one location within the retail store in response to the alphanumeric characters contained in any already-received guidance request signals after each of the series of guidance request signals is received. At step 106, the guidance server can transmitting a series of guidance response signals to the electronic computing device in response to the determination of the at least one location. Each of the series of guidance response signal contains data indicative of the determined location within the retail store. The exemplary process ends at step 108.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
   receiving, with a computer guidance server via a network, guidance request signals from consumers shopping in one or more physical retail stores or an online retail store, wherein the computer guidance server comprises:
     a computerized retail store database comprising products, floor plans of the one or more physical retail stores, locations of each of the products within each of the one or more physical retail stores, and levels of stock for the products;
     a computerized product database comprising product details, product specifications, and consumer reviews for the products; and
     a computer processing device;
   wherein receiving the guidance request signals comprises receiving, with the computer processing device of the computer guidance server, a series of guidance request signals from an electronic computing device operated by a consumer shopping in one of the one or more physical retail stores wherein each guidance request signal of the series of guidance request signals comprises an alphanumeric character, wherein the guidance request signals comprise the series of guidance request signals, and wherein the consumers comprise the consumer;
   successively re-determining, with the computer processing device, a retail product of the products and corresponding to the alphanumeric characters contained in any already-received guidance request signals after each of the series of guidance request signals is received;
   successively re-determining, with the computer processing device, whether the retail product is available in the one of the one or more physical retail stores or whether the retail product is available in the online retail store instead of within the one of the one or more physical retail stores after the each of the series of guidance request signals is received;
   upon a determination that the retail product is available in the online retail store instead of within the one of the one or more physical retail stores, transmitting data that enables the electronic computing device to present a message notifying the consumer that the retail product is only available in the online retail store;
   upon a determination that the retail product is available in the one of the one or more physical retail stores, determining, with the computer processing device, at least one location of the retail product within the one of the one or more physical retail stores and corresponding to the alphanumeric characters;
   transmitting, with the computer processing device, a series of guidance response signals to the electronic computing device in response to the determination of the at least one location of the retail product, wherein each of the series of guidance response signals comprises data indicative of the at least one location, as determined, within the one of the one or more physical retail stores of the retail product and further comprises data that enables the electronic computing device to add a selectable icon to a map of the one of the one or more physical retail stores that visually identifies the at least one location on the map of the one of the one or more physical retail stores;

receiving a product interest signal from the electronic computing device in response to the consumer selecting the selectable icon;

identifying the retail product associated with the product interest signal; and transmitting a product information signal to the electronic computing device in response to receiving the product interest signal, the product information signal providing information to the consumer regarding the retail product.

2. The computer-implemented method of claim 1 wherein receiving the series of guidance request signals further comprises:

receiving, with the computer processing device of the computer guidance server, a guidance initialization signal from the electronic computing device prior to receiving the series of guidance request signals, wherein the guidance initialization signal comprises audio data.

3. The computer-implemented method of claim 2 wherein receiving the series of guidance request signals further comprises:

receiving, with the computer processing device of the computer guidance server, the guidance initialization signal comprising a voice of the consumer encoded in digital form.

4. The computer-implemented method of claim 3 wherein receiving the series of guidance request signals further comprises:

detecting, with an audio processing module of the computer processing device, a content of speech of the consumer comprising verbal statements or verbal commands.

5. The computer-implemented method of claim 1 further comprising:

communicating, with the computer processing device, to the electronic computing device running an app prior to receiving the series of guidance request signals, wherein the series of guidance request signals are generated with the app.

6. The computer-implemented method of claim 1 wherein successively re-determining whether the retail product is available in the one of the one or more physical retail stores further comprises:

searching, with the computer processing device, the computerized retail store database; and identifying all of the products identified at least in part by the alphanumeric characters contained in the any already-received guidance request signals of the series of guidance request signals.

7. The computer-implemented method of claim 1 wherein transmitting the series of guidance response signals further comprises:

transmitting, with the computer processing device, the series of guidance response signals to the electronic computing device wherein at least one of the series of guidance response signals comprises video data.

8. The computer-implemented method of claim 7 wherein transmitting the series of guidance response signals further comprises:

transmitting, with the computer processing device, the series of guidance response signals to the electronic computing device wherein the at least one of the series of guidance response signals comprises the video data in a form of the map comprising the floor plan of the one of the one or more physical retail stores displayed by the electronic computing device.

9. The computer-implemented method of claim 7 wherein transmitting the series of guidance response signals further comprises:

transmitting, with the computer processing device, the series of guidance response signals to the electronic computing device wherein the at least one of the series of guidance response signals comprises the video data in a form of text displayed by the electronic computing device.

10. The computer-implemented method of claim 7 wherein transmitting the series of guidance response signals further comprises:

transmitting, with the computer processing device, the series of guidance response signals to the electronic computing device wherein the at least one of the series of guidance response signals comprises the video data in a form of the map comprising the floor plan of the one of the one or more physical retail stores, the selectable icon overlaying the map at the location of a first product within the one of the one or more physical retail stores, and text identifying the first product disposed proximate to the selectable icon, wherein the map, the selectable icon, and the text are displayable to the consumer through the electronic computing device.

11. The computer-implemented method of claim 10 wherein transmitting the series of guidance response signals further comprises:

transmitting, with the computer processing device, the series of guidance response signals to the electronic computing device wherein successive guidance response signals of the at least one of the series of guidance response signals change a display of the selectable icon and the text relative to a display of the selectable icon and text dictated by previous guidance response signals.

12. The computer-implemented method of claim 10 further comprising:

accessing, with the computer processing device, the computerized product database and retrieving the information associated with the retail product; and transmitting, with the computer processing device, the information associated with the retail product to the electronic computing device.

13. The computer-implemented method of claim 7 wherein transmitting the series of guidance response signals further comprises:

transmitting, with the computer processing device, the series of guidance response signals to the electronic computing device wherein the at least one of the series of guidance response signals comprises: the video data in a form of the map of the one of the one or more physical retail stores; a set of selectable icons overlaying the map at locations of the retail product within the one of the one or more physical retail stores corresponding to the alphanumeric characters contained in the any already-received guidance request signals of the series of guidance request signals and text identifying the product wherein the text is respectively disposed proximate to a corresponding one of the set of selectable icons.

14. The computer-implemented method of claim 13 wherein transmitting the series of guidance response signals further comprises:

transmitting, with the computer processing device, the series of guidance response signals such that at least two of the set of selectable icons are differently colored from one another, wherein a first color corresponds to one of the products that is in-stock at the one of the one or more physical retail stores and a second color corresponds to one of the products that is out-of-stock at the one of the one or more physical retail stores.

15. The computer-implemented method of claim 1 further comprising:
transmitting, with the computer processing device, a proposed alphanumeric character to the consumer in response to the alphanumeric characters contained in the any already-received guidance request signals of the series of guidance request signals.

16. The computer-implemented method of claim 1 further comprising:
identifying, with the computer processing device, a position of the electronic computing device operated by the consumer within the one of the one or more physical retail stores.

17. The computer-implemented method of claim 1 further comprising:
accessing, with the computer processing device, the computerized product database and retrieving the information associated with the retail product,
wherein successively re-determining whether the retail product is available in the one of the one or more physical retail stores further comprises:
searching, with the computer processing device, the computerized retail store database; and
identifying all of the products identified at least in part by the alphanumeric characters contained in the any already-received guidance request signals of the series of guidance request signals;
communicating, with the computer processing device, to the electronic computing device running an app prior to receiving the series of guidance request signals, wherein the series of guidance request signals are generated with the app;
wherein receiving the series of guidance request signals further comprises:
receiving, with the computer processing device of the computer guidance server, a guidance initialization signal from the electronic computing device prior to receiving the series of guidance request signals, wherein the guidance initialization signal comprises audio data;
receiving, with the computer processing device of the computer guidance server, the guidance initialization signal comprising a voice of the consumer encoded in digital form; and
detecting, with an audio processing module of the computer processing device, a content of speech of the consumer comprising verbal statements or verbal commands;
wherein transmitting the series of guidance response signals further comprises:
transmitting, with the computer processing device, the series of guidance response signals to the electronic computing device wherein at least one of the series of guidance response signals comprises video data;
transmitting, with the computer processing device, the series of guidance response signals to the electronic computing device wherein the at least one of the series of guidance response signals comprises the video data in a form of the map comprising the floor plan of the one of the one or more physical retail stores displayed by the electronic computing device;
transmitting, with the computer processing device, the series of guidance response signals to the electronic computing device wherein the at least one of the series of guidance response signals comprises the video data in the form of text displayed by the electronic computing device;
transmitting, with the computer processing device, the series of guidance response signals to the electronic computing device wherein the at least one of the series of guidance response signals comprises the video data in the form of the map comprising the floor plan of the one of the one or more physical retail stores, the selectable icon overlaying the map at the location of a first product within the one of the one or more physical retail stores, and text identifying the first product disposed proximate to the selectable icon, wherein the map, the selectable icon, and the text are displayable to the consumer through the electronic computing device;
transmitting, with the computer processing device, the series of guidance response signals to the electronic computing device wherein successive guidance response signals of the at least one of the series of guidance response signals change a display of the selectable icon and the text relative to a display of the selectable icon and text dictated by previous guidance response signals;
transmitting, with the computer processing device, the series of guidance response signals to the electronic computing device wherein the at least one of the series of guidance response signals comprises: the video data in the form of the map of the one of the one or more physical retail stores; a set of selectable icons overlaying the map at locations of the products within the one of the one or more physical retail stores corresponding to the alphanumeric characters contained in the any already-received guidance request signals of the series of guidance request signals; and text identifying the product wherein the text is respectively disposed proximate to corresponding ones of the set of selectable icons;
transmitting, with the computer processing device, the series of guidance response signals such that at least two of the set of selectable icons are differently colored from one another, wherein a first color corresponds to one of the products that is in-stock at the one of the one or more physical retail stores and a second color corresponds to one of the products that is out-of-stock at the one of the one or more physical retail stores;
transmitting, with the computer processing device, a proposed alphanumeric character to the consumer in response to the alphanumeric characters contained in the any already-received guidance request signals of the series of guidance request signals; and
transmitting, with the computer processing device, the information associated with the retail product to the electronic computing device.

18. A method comprising:
offering products for sale at one or more physical retail stores or through an online retail store;
maintaining a computerized retail store database comprising identities of the products offered for sale in the one or more physical retail stores, a map comprising floor plans of each of the one or more physical retail stores, locations of the products offered for sale in the one or more physical retail stores, and the identities of the products offered for sale through the online retail store, wherein at least some of the products are offered for sale both at the one or more physical retail stores and through the online retail store;

maintaining a computerized product database comprising the identities of the products offered for sale in the one or more physical retail stores comprising product details, product specifications, and consumer reviews for at least some of the products, wherein the at least some of the products are offered for sale both at the one or more physical retail stores or through the online retail store;

receiving, with a computer processing device of a computer guidance server via a network, a series of guidance request signals from an electronic computing device operated by a consumer shopping in one of the one or more physical retail stores or through the online retail store, wherein each guidance request signal of the series of guidance request signals comprises an alphanumeric character, wherein consumers comprise the consumer;

successively re-determining, with the computer processing device, a retail product of the products and corresponding to the alphanumeric characters contained in any already-received guidance request signals after each of the series of guidance request signals is received;

successively re-determining, with the computer processing device, whether the retail product is available in the one of the one or more physical retail stores or whether the retail product is available through the online retail store instead of within the one of the one or more physical retail stores after the each of the series of guidance request signals is received;

upon a determination that the retail product is available through the online retail store instead of within the one of the one or more physical retail stores, transmitting data that enables the electronic computing device to present a message notifying the consumer that the retail product is only available through the online retail store;

upon a determination that the retail product is available in the one of the one or more physical retail stores, determining, with the computer processing device, at least one location of the retail product within the one of the one or more physical retail stores and corresponding to the alphanumeric characters;

transmitting, with the computer processing device, a series of guidance response signals to the electronic computing device in response to the determination of the at least one location of the retail product, wherein the each of the series of guidance response signals comprises data indicative of the at least one location, as determined, of the retail product within the one of the one or more physical retail stores and further comprises data that enables the electronic computing device to add a selectable icon to the map comprising the floor plan of the one of the one or more physical retail stores that visually identifies the at least one location on the map of the one of the one or more physical retail stores;

receiving a product interest signal from the electronic computing device in response to the consumer selecting the selectable icon;

identifying the retail product associated with the product interest signal; and transmitting a product information signal to the electronic computing device in response to receiving the product interest signal, the product information signal providing information to the consumer regarding the retail product.

19. The method of claim 18 wherein transmitting the series of guidance response signals further comprises:
transmitting, with the computer processing device, the series of guidance response signals to the electronic computing device wherein at least one of the series of guidance response signals comprises video data in a form of the map comprising the floor plan of the one of the one or more physical retail stores; a set of selectable icon overlaying the map of the one of the one or more physical retail stores at locations of the products corresponding to the alphanumeric characters contained in the any already-received guidance request signals of the series of guidance request signals and text identifying the products wherein the text is respectively disposed proximate to corresponding ones of the set of selectable icons, wherein at least two of the set of selectable icons are differently colored from one another, wherein a first color corresponds to one of the products that is offered for sale at the one of the one or more physical retail stores and a second color different from the first color corresponds to one of the products that is offered for sale through the online retail store.

20. A system comprising:
a computer server;
the computer server, via a network, receiving guidance request signals from consumers shopping in one or more physical retail stores or an online retail store, wherein the computer server comprises:
a computerized retail store database comprising products, floor plans, product locations in the one or more physical retail stores, and levels of stock for each of the products;
a computerized product database comprising product details, product specifications, and consumer reviews for the products; and
a computer processing device;
the computer server receiving a series of guidance request signals from an electronic computing device operated by a consumer shopping in one of the one or more physical retail stores, wherein each guidance request signal of the series of guidance request signals comprises an alphanumeric character, wherein the guidance request signals comprise the series of guidance request signals, and wherein the consumers comprise the consumer;
the computer server successively re-determining a retail product of the products and corresponding to the alphanumeric characters contained in any already received guidance request signals after each of the series of guidance request signals is received;
the computer server successively re-determining whether the retail product is available in the one of the one or more physical retail stores or whether the retail product is available in the online retail store instead of within the one of the one or more physical retail stores after receiving the each of the series of guidance request signals, wherein:
upon a determination that the retail product is available in the online retail store, the computer server transmitting data that enables the electronic computing device to present a message notifying the consumer that the retail product is only available in the online retail store; and upon a determination that the retail product is available in at least one location of the one of the one or more physical retail stores, the computer server determining at least one location of the retail product within the one of the one or more physical retail stores and corresponding to the alphanumeric characters, and the computer server transmitting a series of guidance response signals to the electronic computing device in response to the determination of the at least one location of the retail product, wherein the each of the series of guidance response signals comprises data indicative of the at least one location, as determined, within the one of the one or more physical retail stores of the retail product and further comprises data that enables the electronic computing device to add a selectable icon to a map of the one of the one or more physical retail stores that visually identifies the at least one location on the map of the one of the one or more physical retail stores;

the computer server receiving a product interest signal from the electronic computing device in response to the consumer selecting the selectable icon;

the computer server identifying the retail product associated with the product interest signals; and the computer server transmitting a product information signal to the electronic computing device in response to receiving the product interest signal, the product information signal providing information to the consumer regarding the retail product.

* * * * *